(12) United States Patent
Novick et al.

(10) Patent No.: US 6,404,737 B1
(45) Date of Patent: Jun. 11, 2002

(54) MULTI-TIERED SHAPING ALLOWING BOTH SHAPED AND UNSHAPED VIRTUAL CIRCUITS TO BE PROVISIONED IN A SINGLE VIRTUAL PATH

(75) Inventors: Ronald P. Novick, Orange; Cuong T. Luu, Kensington; John Cumberton, Danbury, all of CT (US)

(73) Assignee: Ahead Communications Systems, Inc., Middlebury, CT (US)

( * ) Notice: Subject to any disclaimer, the term of this patent is extended or adjusted under 35 U.S.C. 154(b) by 0 days.

(21) Appl. No.: 09/636,277

(22) Filed: Aug. 10, 2000

(51) Int. Cl.$^7$ ................................. G01R 31/08
(52) U.S. Cl. ............................ 370/235.1; 370/395.43; 370/412
(58) Field of Search ................... 370/230–233, 370/235, 229, 395, 397, 389, 392, 399, 412, 416, 429, 468, 395.43, 235.1; 709/240, 103, 233

(56) References Cited

U.S. PATENT DOCUMENTS

| | | | |
|---|---|---|---|
| 5,768,273 A | * 6/1998 | Aznar et al. | 370/395 |
| 5,946,297 A | * 8/1999 | Calvignac et al. | 370/230 |
| 6,011,775 A | * 1/2000 | Bonomi et al. | 370/230 |
| 6,163,542 A | * 12/2000 | Carr et al. | 370/399 |
| 6,188,697 B1 | * 2/2001 | Umehira et al. | 370/412 |

* cited by examiner

Primary Examiner—Alpus H. Hsu
Assistant Examiner—Duc Ho
(74) Attorney, Agent, or Firm—Patton Boggs LLP

(57) ABSTRACT

The invention utilizes two-stage shaping and two-priority queuing thereby allowing both shaped and unshaped virtual circuits to be provisioned in a single virtual path. For each VP, a separate dynamic buffer is set up for each shaped VC and unshaped VC within the VP. The shaped cells stored in dynamic buffers are dequeued via VC scheduling (first stage shaper) to a high priority queue according to the shaped VC contracts, and the unshaped cells stored in dynamic buffers are dequeued in a round robin manner to a low priority queue. The outputs of both the high priority queue and the low priority queue are passed to a second stage shaper where cells from the high priority queue are scheduled according to the VP contract, and cells from the low priority queue are also scheduled according to the VP contract, but only when VP bandwidth is not being used by the high priority cells. In order to avoid overrunning the high priority queue in the second stage, the iPSR (Peak Shaping Rate increment) of the CBR VCs in the VP is chosen to be the iSSR (Sustained Shaping Rate increment) of the VP. The iPSR of the CBR VCs in the VP can be chosen to be higher than the iSSR of the VP as long as cell loss is not experienced at the second stage caused by overrunning the high priority queue. In addition, the calculated bucket for CBR service in the first stage is made a function of the Peak Cell Rate (PCR) of the VP.

12 Claims, 5 Drawing Sheets

UNI CELL STRUCTURE

| WORD | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | GFC | | | | VPI | | | | VPI | | | | VCI | | | |
| 2 | VCI | | | | | | | | VCI | | | | PT | | | CLP |
| 3 | HEC | | | | | | | | | | | | | | | |
| 4-27 | PAYLOAD | | | | | | | | | | | | | | | |

FIG. 2
*PRIOR ART*

NNI CELL STRUCTURE

| WORD | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | VPI | | | | | | | | VPI | | | | VCI | | | |
| 2 | VCI | | | | | | | | VCI | | | | PT | | | CLP |
| 3 | HEC | | | | | | | | | | | | | | | |
| 4-27 | PAYLOAD | | | | | | | | | | | | | | | |

UNI CELL WITH ROUTING

| WORD | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | UNUSED | | | | | CELL ID | | | UNUSED | | | | MGT | UN-USED | CP | |
| 2 | UNUSED | | | | | | | | SWITCH HEADER 1 | | | | | | | |
| 3 | SWITCH HEADER 2 | | | | | | | | SWITCH HEADER 3 | | | | | | | |
| 4 | GFC | | | | VPI | | | | VPI | | | | VCI | | | |
| 5 | VCI | | | | | | | | VCI | | | | PT | | | CLP |
| 6 | HEC | | | | | | | | | | | | | | | |
| 7-30 | PAYLOAD | | | | | | | | | | | | | | | |

MULTI-TIERED SHAPING ALLOWING BOTH SHAPED AND UNSHAPED VIRTUAL CIRCUITS TO BE PROVISIONED IN A SINGLE VIRTUAL PATH

BACKGROUND OF THE INVENTION

1. Field of the Invention

The invention relates to Asynchronous Transfer Mode (ATM) telecommunications. More particularly, the invention relates to a method and apparatus which allows both shaped and unshaped virtual circuits (VCs) to be provisioned in a single virtual path (VP).

2. State of the Art

Perhaps the most awaited, and now fastest growing technology in the field of telecommunications is known as Asynchronous Transfer Mode (ATM) technology. ATM is providing a mechanism for removing performance limitations of local area networks (LANs) and wide area networks (WANS) and providing data transfers at a speed of on the order of gigabits/second. The variable length packets of LAN and WAN data are being replaced with ATM cells which are relatively short, fixed length packets. Because ATM cells can carry voice, video and data across a single backbone network, the ATM technology provides a unitary mechanism for high speed end-to-end telecommunications traffic.

Current ATM service is offered in different categories according to a user's needs. Some of these categories include constant bit rate (CBR), variable bit rate (VBR), and unspecified bit rate (UBR). The CBR and VBR categories are subject to a contract where the network service provider guarantees a certain level of service. The UBR category is given the network service provider's "best efforts" after the CBR and VBR categories are serviced.

In an ATM network, an ATM cell is routed on the basis of VPI (virtual path identifier) and VCI (virtual channel identifier) values contained in the cell. On a particular virtual path (VP), defined by the value of the VPI field in the ATM cells on a particular physical link, there may be a number of virtual channels (VCs), each identified by a particular VCI value. As is well known, the VPI and VCI values are neither globally unique nor fixed; the values may change from node to node across a network.

In an ATM switch, traffic on each virtual channel is monitored and routed individually (different VCs on a common VP may, for example be routed differently within the switch). Incoming traffic is normally "policed" to ensure that the incoming traffic of individual VCs is conforming with its traffic contract, and the outgoing traffic is "shaped" to ensure that the outgoing traffic of individual VCs is conforming with its traffic contract (for example to alleviate any cell clumping that may have occurred in the switch), to reduce the risk of cells being discarded by a subsequent policing mechanism. Shaping is not performed on UBR connections.

In certain network configurations, an ATM switch may receive cells from multiple VCs all having a common VPI. Conversely, multiple VCs may be destined for transmission along a single VP over a common physical link. As mentioned above, each VC would conventionally be treated independently; this is required as each is required to meet its QoS (quality of service) objectives.

Prior art FIG. 1 illustrates portions of a state-of-the-art APEX E-Series ATM switch manufactured by General DataComm, Inc., Middlebury, Conn. The ATM switch includes one or more Line Interface Modules (LIMs) 10, each of which is associated with an E-Series Controller Card (ECC) 12, and one Switch Fabric Card 14 through which all of the ECCs are interconnected. On the ingress side of the LIM 10, the LIM deserializes the incoming bit stream and passes a parallel 16-bit cell stream over to the ECC 12. Each ATM cell has a fixed length of 53-bytes and its structure is dependent on the switch interface. The User-Network Interface (UNI) cell structure is used if the interface is between the user and the switch. The Network-Network Interface (NNI) cell structure is used if the interface is between switches.

Prior art FIGS. 2 and 3 illustrate the UNI and NNI cell structures respectively in a 16-bit parallel format. As mentioned above, the routing information for each cell is identified in the VPI and VCI fields. The PT (payload type) field indicates whether the cell contains user information or network management information. The CLP field indicates cell loss priority and the cell header can be checked against transmission errors using the HEC (header error check) field. In the UNI structure, the GFC (generic flow control) field is set to all zeros.

Returning now to prior art FIG. 1, the RCMP chipset 16 in the ECC 12 examines each ATM cell received from the LIM 10. If the connection specified in the cell header has not been provisioned, the cell is discarded. If the connection has been provisioned, and the "policer" has been enabled, the cell is policed according to the user's contract. If the cell is not discarded, internal routing information provided by the VC record table 17 is appended to the cell header. According to the system used by the APEX Switch, three 16-bit words are appended to the beginning of the cell as illustrated in prior art FIG. 4 for the case of a UNI cell. The CELL ID field has two possible values: 00 for a user cell or host inserted cell and 11 for a backward reporting OAM (operations, administration, and maintenance) cell. The CL field is set to 1 to enable CLP marking. The MGT field is set to 1 to identify a management or extracted cell for the host. The CP field is set to one of four possible cell priority values: 00, 01, 10, 11, where 00 is the lowest priority. Switch Header 1 includes five fields: SCP, Link Dest, Spare, EFCI, and S. SCP is set to 1 for high priority (CP=10 or 11). Link Dest is a three bit address for indicating one of six links (000 through 101), for indicating a multicast cell (110), and for indicating a management cell (111). EFCI is set to 1 to enable EFCI (explicit forward congestion indication) marking. The S field is set to 1 for VPC (virtual path connection) flows and to 0 for VCC (virtual channel connection) flows.

With assistance from an ingress FPGA (field programmable gate array) 18, the RCMP 16 sends the cell with the appended internal routing information to the switch fabric card 14. Based on the internal routing information, the switch fabric card 14 routes the cell to the egress side of the desired slot (LIM and ECC pair). At the egress side of the ECC 12, the MAKER chipset 20, with the assistance of an egress FPGA 22 (and any buffering provided by buffers 24) receives the cell from the switch fabric card 14 and performs traffic shaping on shaped connections. Traffic shaping involves three stages: enqueueing, scheduling, and dequeueing.

Referring now to prior art FIG. 5, the enqueueing function involves setting up a separate dynamic buffer queue $32a$–$32n$ and $34a$–$34n$ for each provisioned VC where the buffer space is allocated according to Equation (1) where T(U) is the per VC queue allowed; Tf is the minimum buffer size set by management software; y is –8 for CBR and rt-VBR, –4 for nrt-VBR, and 0 for UBR; B is the total queue available (65535 for CBR, rt-VBR and UBR, 64511 for nrt-VBR); and U is the total queue usage.

$$T(U)=Tf+(2*\exp(y)*(B-U)) \quad (1)$$

The amount of per VC queue allowed is used to compare with the total number of enqueued cells via a cell counter (not shown). If the latter is less than the prior, then the cell is enqueued (to a location pointed by a link list free pointer). Otherwise, the cell is discarded.

The cells in each of the buffers 32a–32n are scheduled for dequeueing by a VC scheduler 36 which uses a continuous state leaky bucket algorithm from ITU-T I.371 to enforce cell emission rates from multiplexer 38. The leaky bucket algorithm is used to determine cell emission rates of shaped connections either at a peak shaping rate (PSR) or a sustained shaping rate (SSR). Cells are emitted at PSR if the current bucket level is less than or equal to a predetermined threshold. Otherwise, cells are emitted at SSR. The bucket level is updated after each cell is dequeued for emission and the emission time for the next cell is determined. Once the emission time of the next cell is determined, it is scheduled by pushing it onto a scheduling scoreboard where it awaits the emission opportunity.

The UBR cells in the buffers 34a–34n are dequeued according to a best efforts list 40 with fairness among UBR connection assured by a round robin selector 42 controlling multiplexer 44. As mentioned above, UBR connections do not have specified parameters and all the UBR connections in a link share whatever bandwidth is available after the shaped traffic is serviced. According to the best efforts list method, only one cell from each UBR can be present in the best efforts list at a time; and the cells are emitted on a first in first out basis.

As shown in FIG. 5 (in conjunction with FIG. 1), cells of both types (shaped and unshaped) are blended at multiplexer 46 for transmission to the ALM chipset (26 in FIG. 1, with connection table 28 providing translation). More particularly, a shaped cell is dequeued for emission when its scheduled time is equal to the current time. Unshaped cells are dequeued when there is available bandwidth, i.e. no shaped cell having the current time as its scheduled time. The ALM chipset (26 in FIG. 1) translates the internal VPI/VCI to the external VPI/VCI, removes the routing header and passes the cell in 16-bit streams to the LIM. The LIM serializes the 16-bit cell streams and passes the bitstream out to the link.

The shaping methods described above are generally defined in ATM Forum Traffic Management 4.0. These methods work well, enforcing each VC contract, only if each VC is provisioned as an individual connection. If several VCs are provisioned to share a common VP tunnel, individual contracts cannot be enforced. When several VCs share the same VP, only the VP connection is provisioned and the VPI is used to identify which traffic streams are allowed to use this VP. This means that different traffic streams from multiple sources within the same VPI are all treated as the same source by the shaper since only one (VP) connection is provisioned. Therefore, per VC queuing, per contract shaping, and packet discard features can no longer be supported. Moreover, if unshaped (UBR) VCs are provisioned in the same VP, the VP contract may be violated because the aggregate of UBRs may utilize bandwidth beyond the bandwidth specified in the VP contract.

SUMMARY OF THE INVENTION

It is therefore an object of the invention to provide methods and apparatus for managing shaped and unshaped traffic in an ATM switch.

It is also an object of the invention to provide methods and apparatus for shaping multiple VCs within a single VP.

It is another object of the invention to provide methods and apparatus for managing multiple unshaped VCs within a single VP.

It is still another object of the invention to provide methods and apparatus for shaping multiple VCs and managing multiple unshaped VCs all within the same VP.

It is yet another object of the invention to provide methods and apparatus whereby, within a single VP, multiple shaped VCs emit cells according to their individual contracts and unshaped VCs emit cells based on available VP bandwidth and share the available bandwidth fairly.

In accord with these objects which will be discussed in detail below, the methods and apparatus of the present invention utilize two-stage shaping and two-priority queuing. According to the presently preferred embodiment, for each VP, a separate dynamic buffer is set up for each shaped VC and unshaped VC within the VP. The shaped cells stored in dynamic buffers are dequeued via VC scheduling (first stage shaper) to a high priority queue according to the shaped VC contracts, and the unshaped cells stored in dynamic buffers are dequeued in a round robin manner to a low priority queue. The outputs of both the high priority queue and the low priority queue are passed to a second stage shaper where cells from the high priority queue are scheduled according to the VP contract, and cells from the low priority queue are also scheduled according to the VP contract, but only when VP bandwidth is not being used by the high priority cells. In order to avoid overrunning the high priority queue in the second stage, the iPSR (Peak Shaping Rate increment) of the CBR VCs in the VP is chosen to be the iSSR (Sustained Shaping Rate increment) of the VP. The iPSR of the CBR VCs in the VP can be chosen to be higher than the iSSR of the VP as long as cell loss is not experienced at the second stage caused by overrunning the high priority queue. In addition, the calculated bucket for CBR service in the first stage is made a function of the Peak Cell Rate (PCR) of the VP. Otherwise, the enqueueing, dequeueing, and scheduling algorithms of the first and second stage shapers are the same.

The methods and apparatus of the invention can also be used with individually provisioned VCs in the following manner. Separate dynamic buffers are set up to store cells from each shaped VC outside of a shared VP and these cells are dequeued by the second stage shaper. Individual dynamic buffers are set up to store the cells from the UBR connections outside of a shared VP. These cells are dequeued to a best efforts list in a round robin manner when bandwidth is available. The outputs of the second stage shaper and the best efforts list are multiplexed and passed to the ALM chipset.

Additional objects and advantages of the invention will become apparent to those skilled in the art upon reference to the detailed description taken in conjunction with the provided figures.

BRIEF DESCRIPTION OF THE DRAWINGS

FIG. 2 is a diagram illustrating the structure of a prior art ATM UNI cell in a 16-bit word format;

FIG. 3 is a diagram illustrating the structure of a prior art ATM NNI cell in a 16-bit word format;

FIG. 4 is a diagram illustrating the structure of a prior art ATM UNI cell in a 16-bit word format with a three word internal routing header appended to it;

DETAILED DESCRIPTION OF THE PREFERRED EMBODIMENTS

Figure 6:
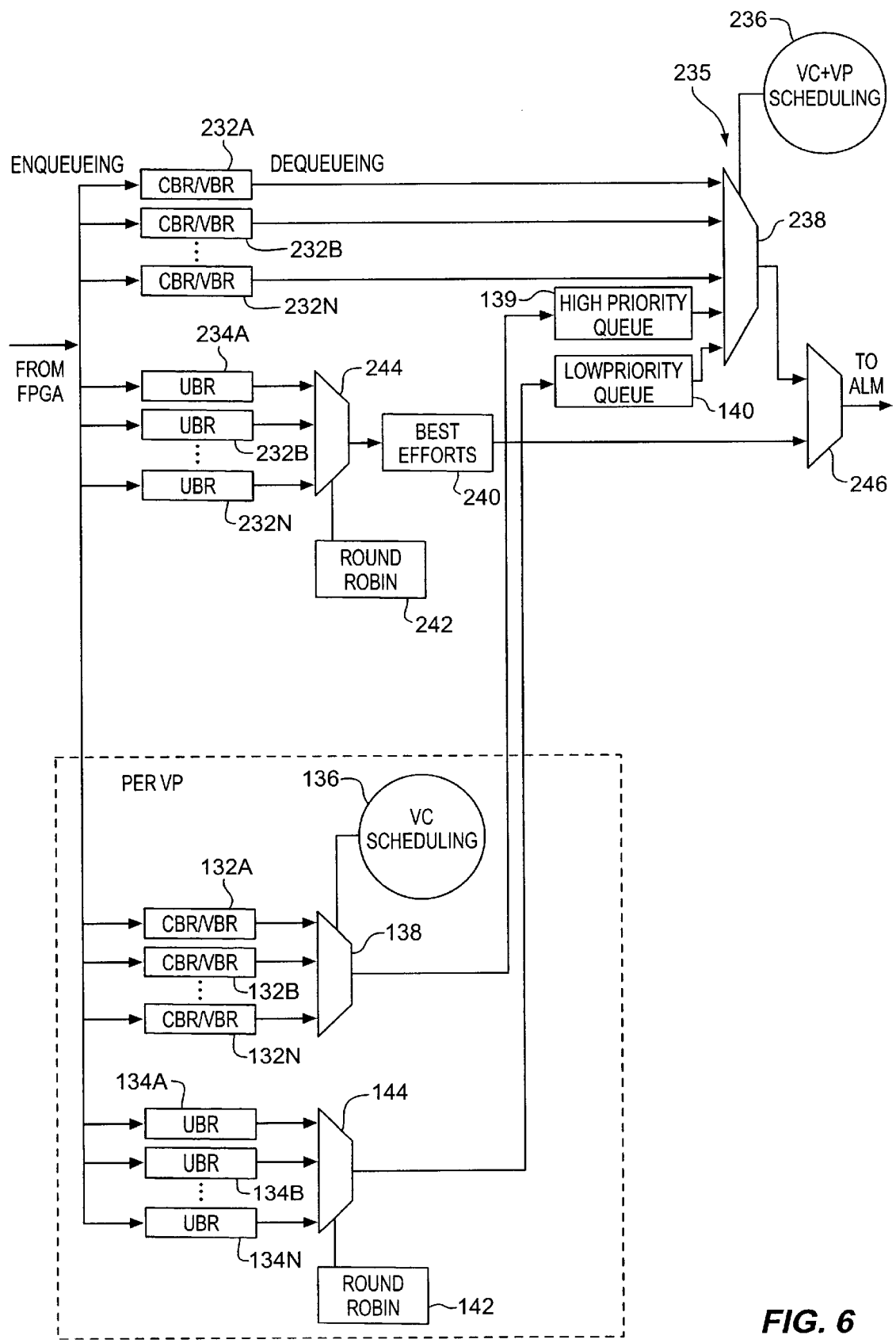
FIG. 6 is a simplified schematic diagram illustrating two-tiered shaping according to the invention.

Referring now to FIG. 6, according to the presently preferred embodiment of the invention, for each VP, a separate dynamic buffer 132a–132n, 134a–134n is set up for each VC within the VP. The buffer space of the dynamic buffers is preferably allocated according to Equation (1), above, and the cells are enqueued as described with reference to the state-of-the-art.

The cells in dynamic buffers 132a–132n are dequeued according to VC scheduling (first stage shaper) 136 using a leaky bucket algorithm to enforce cell emission rates from multiplexer 138 as described in more detail below with reference to Equations (2)–(13). Unlike the prior art, the cells are dequeued to a high priority queue 139 in the second stage (rather than to the ALM chipset).

The cells in dynamic buffers 134a–134n are dequeued with a round robin selector 142 which controls a multiplexer 144. Unlike the prior art, the cells are dequeued to a low priority queue 140 in the second stage (rather than a best efforts list).

According to the invention, the second stage shaper 235 is composed of another scheduler 236 and another multiplexer 238. The second stage shaper 235 uses a leaky bucket algorithm to schedule cells from the high priority queue 139 according to the VP contract. Moreover, the second stage shaper 235 schedules cells from the low priority queue according to the VP contract, but only when VP bandwidth is not being used by the high priority cells.

The leaky bucket algorithms of the first stage VC scheduler 136 are best understood with reference to the following Equations (2)–(10).

In particular, the calculated bucket for CBR service in the first stage (for an OC-3 link) is shown in Equation (2)

$$Bm=((CDVT*PCR\text{of }VC)*(((353207/PCR\text{of }VC)*G)-((353207/PCR\text{of }VP)*G))) \quad (2)$$

where CDVT (Cell Delay Variation Tolerance) is specified in the contract for the VC, PCR is peak cell rate specified in the VC or VP contract as shown, and G (shaping granularity) is either 1 or 128. G is set to 1 if the SCR (Sustained Cell Rate specified in the VC contract)$\leq$3532. This gives the shaping precision of one cell slot time. G is set to 128 if the SCR$\geq$20776. This gives a shaping precision of 1/128 of a cell slot time. If 3532<SCR<20776, G is set to 128 unless Bm>65536-iSSR, (see Equations (9) and (10) for iSSR calculation) in which case G is set back to 1 and Bm and iSSR are recalculated with G=1. Due to 16-bit microcontroller limitation, Bm is constrained to a 16-bit value, the maximum being 0xffff–(iSSR+G) and the minimum being iSSR+G.

The calculated bucket for rt-VBR (real time VBR) service in the first stage (for an OC-3 link) is shown in Equation (3) where MBS is (Maximum Burst Size) specified in the VC contract.

$$Bm=((MBS-1)+(CDVT*PCR))*(((353207/SCR)*G)-((353207/PCR)*G))) \quad (3)$$

The calculated bucket for nrt-VBR (non-real time VBR) service in the first stage (for an OC-3 link) is shown in Equation (4) where R=(PCR*PRL/100)+(SCR*(1–(PRL/100))), PCR is the Peak Cell Rate specified in the VC contract, SCR is the sustained cell rate in the VC contract, and PRL is a Peak Rate Limiting percentage number specified by the user in the VC contract.

$$Bm=((MBS-1)+(CDVT*R))*(((353207/SCR)*G)-((353207/R)*G)) \quad (4)$$

The current bucket update for all shaped service categories in the first stage is shown in Equation (5) where NOW is the emission time of the current cell, LDT is the emission time of the previous cell, and iSSR is defined below in Equations (9) and (10).

$$Bd=Bd-(NOW-LDT)+iSSR \quad (5)$$

The values iPSR and iSSR (for an OC-3) link for the first stage are defined as follows in Equations (6) through (10).:

$$iPSR=iSSR \text{ of the } VP, \text{ for } CBR \text{ service} \quad (6)$$

$$iPSR=(353207/PCR)*G, \text{ for } rt\text{-}VBR \text{ service} \quad (7)$$

$$iPSR=(353207/R)*G, \text{ for } nrt\text{-}VBR \text{ service} \quad (8)$$

$$iSSR=(353207/PCR)*G, \text{ for } CBR \text{ service} \quad (9)$$

$$iSSR=(353207/SCR)*G, \text{ for all other shaped service} \quad (10)$$

The emission rate in the first stage is determined for all service categories is determined as follows for each VC:

if Bd$\leq$Bm+iPSR–iSSR then emit next cell at PSR (i.e., next emission time=NOW+iPSR), else emit next cell at SSR (i.e., next emission time= NOW+iSSR).

In the second stage scheduler 236, cells from the high priority queue 139 are all treated as CBR traffic for purposes of minimizing traffic delays. In particular, the calculated bucket for the high priority cells in second stage is given by Equation (11)

$$Bm=CDVT*PCR*(353207/PCR)*G-G) \quad (11)$$

where CDVT is (Cell Delay Variation Tolerance) specified in the VP contract, PCR is peak cell rate specified in the VP contract, and G is either 1 or 128. G is set to 1 if the SCR specified in the VP contract$\leq$3532. This gives the shaping precision of one cell slot time. G is set to 128 if the SCR$\geq$20776. This gives a shaping precision of 1/128 of a cell slot time. If 3532<SCR<20776, G is set to 128 unless Bm>65536-iSSR for the VP contract, [see Equation (13) for iSSR calculation for the VP contract] in which case G is set back to 1 and Bm and iSSR are recalculated with G=1. Due to 16-bit microcontroller limitation, Bm is constrained to a 16-bit value, the maximum being 0xffff–(iSSR+G) and the minimum being iSSR+G.

The current bucket update for the high priority cells in the second stage is shown in Equation (12) where NOW is the emission time of the current cell, LDT is the emission time of the previous cell, and iSSR is given by Equation (13) (for an OC-3 link). iPSR is set to G for CBR service.

$$Bd=Bd-(NOW-LDT)+iSSR \quad (12)$$

$$iSSR=(353207/PCR)*G \text{ for } CBR \text{ service} \quad (13)$$

The emission rate in the second stage is calculated in the same manner as the emission rate in the first stage except that rates for the VP contract are used if it is a VP connection and rates for the VC contracts are used if it is a VC connection.

The methods and apparatus of the invention can also be used with individually provisioned VCs in the following manner. Separate dynamic buffers 232a–232n are set up for each shaped VC outside of a shared VP and individual dynamic buffers 234a–234n are set up for the UBR connections outside of a shared VP.

The cells in the buffers 232a–232n are scheduled for dequeueing by the VC scheduler 236 which uses a leaky bucket algorithm to enforce cell emission rates from multiplexer 238. The leaky bucket algorithm is substantially the same as that used in the first stage scheduler 136 except (a) for the calculated bucket for CBR service which here is calculated using Equation (11) but with VC contract values rather than VP contract values; and (b) for the iPSR which is set to G for CBR service.

Figure 1:
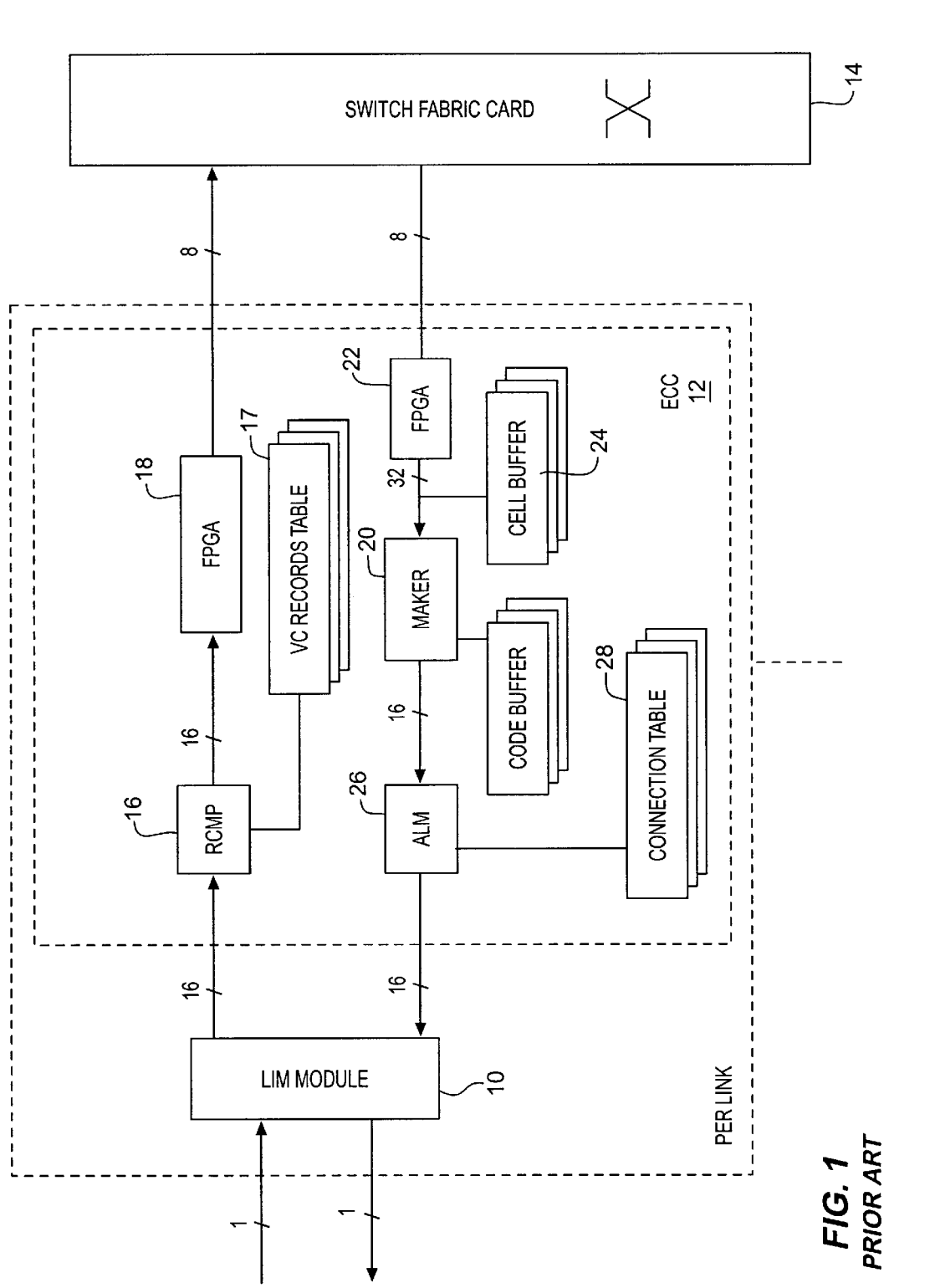
FIG. 1 is a simplified schematic diagram of portions of a state-of-the-art ATM switch.
Figure 5:
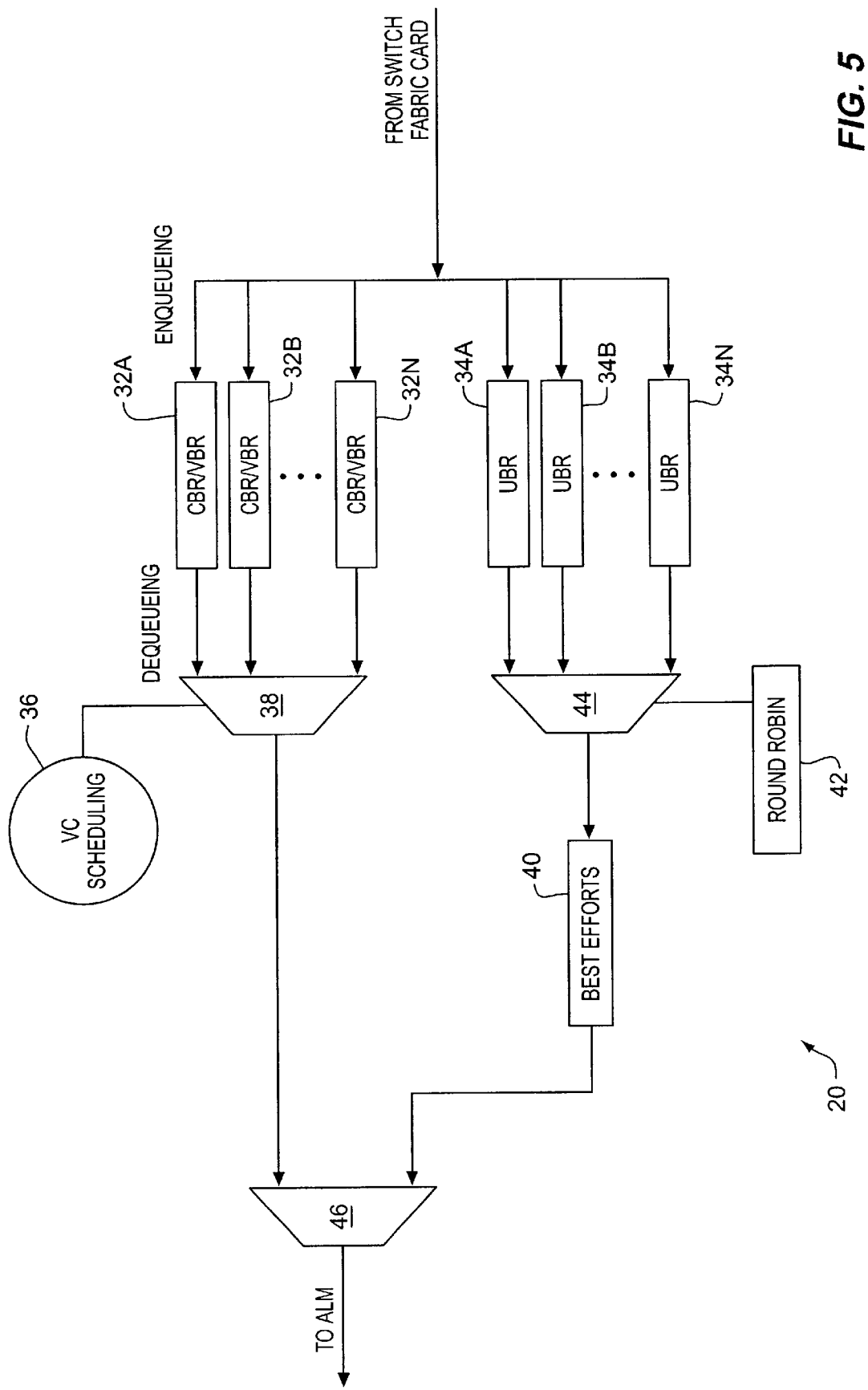
FIG. 5 is a simplified schematic diagram illustrating state-of-the-art traffic shaping in the ATM switch of FIG. 1.

The UBR cells in the buffers 234a–234n are dequeued according to a best efforts list 240 with fairness among UBR connections assured by a round robin selector 242 controlling multiplexer 244 when bandwidth is available. Cells of both types (shaped and unshaped) are blended at multiplexer 246 for transmission to an ALM chipset (such as 26 in FIG. 1).

There have been described and illustrated herein embodiments of methods and apparatus for managing shaped and unshaped traffic over a single virtual path in an ATM switch. While particular embodiments of the invention have been described, it is not intended that the invention be limited thereto, as it is intended that the invention be as broad in scope as the art will allow and that the specification be read likewise. Thus, while particular chipsets and FPGAs have been disclosed, it will be appreciated that other hardware/software could be utilized. Also, while the invention has been shown in the context of an APEX switch, it will be recognized that the invention could be used with other types of ATM switches. Further, while the formulas have been formulated with reference to OC-3 links, it will be appreciated that the invention applies to DS-3 and other links, and that the formulas could be appropriately modified. Moreover, while particular configurations have been disclosed in reference to the setting up and managing of buffers, it will be appreciated that other configurations could be used as well. Furthermore, while the invention has been illustrated as having a single first stage shaper, it will be understood that each VP is provided with a first stage shaper. It will therefore be appreciated by those skilled in the art that yet other modifications could be made to the provided invention without deviating from its spirit and scope as so claimed.

What is claimed is:

1. A method of managing a plurality of shaped virtual circuits sharing a single virtual path, according to a virtual path contract and a plurality of virtual circuit contracts, in an asynchronous transfer mode switch, said method comprising:

providing a buffer for each shaped virtual circuit;

enqueueing cells from each shaped virtual circuit to a corresponding buffer;

dequeueing cells from the buffers of shaped virtual circuits to a first queue according to a first virtual circuit scheduling algorithm based on the virtual circuit contracts;

dequeueing cells from the first queue according to a second virtual circuit scheduling algorithm based on the virtual path contract;

wherein the virtual circuit contracts for shaped virtual circuits specify a Peak Shaping Rate value;

the first virtual circuit scheduling algorithm utilizes a calculated peak shaping rate increment value;

the virtual path contract specifies a sustained shaping rate value;

the second virtual circuit scheduling algorithm utilizes a calculated sustained shaping rate increment value; and for Constant Bit Rate service, the first virtual circuit scheduling algorithm utilizes the virtual path sustained shaping rate increment value in place of the virtual circuit peak shaping rate increment value.

2. The method of claim 1, wherein:

the first and second virtual circuit scheduling algorithms are leaky bucket algorithms.

3. The method of claim 2, wherein:

the calculated bucket for Constant Bit Rate service in the first virtual circuit scheduling algorithm is based in part on the virtual path contract.

4. The method according to claim 3, wherein:

the calculated bucket for Constant Bit Rate service in the first virtual circuit scheduling algorithm is calculated according to the following formula $$Bm=((CDVT*PCR \text{ of virtual circuit})*(((353207/PCR \text{ of virtual circuit})*G)-((353207/PCR \text{ of virtual path})*G)))$$

where CDVT is (Cell Delay Variation Time) specified in the virtual circuit contract, PCR is peak Cell rate specified in the virtual circuit and virtual path contracts, and G is either 1 or 128 based in part on an sustained cell rate specified in the virtual circuit contract.

5. The method of claim 1, wherein:

the second virtual circuit scheduling algorithm treats all of the cells in the first queue as Constant Bit Rate traffic.

6. The method according to claim 1, further comprising:

providing a buffer for each unshaped virtual circuit;

enqueueing cells from each unshaped virtual circuit to a corresponding buffer;

dequeueing cells from the buffers of unshaped virtual circuits, according to a fairness algorithm, to a second queue;

dequeueing cells from the second queue based on available virtual path bandwidth.

7. An apparatus for managing a plurality of shaped virtual circuits sharing a single virtual path, according to a virtual path contract and a plurality of virtual circuit contracts, in an asynchronous transfer mode switch, said apparatus comprising:

first buffer means for providing a buffer for each shaped virtual circuit;

first enqueueing means for enqueueing cells from each shaped virtual circuit to a corresponding buffer;

a first queue;

first dequeueing means for dequeueing cells from the buffers of shaped virtual circuits to said first queue according to a first virtual circuit scheduling algorithm based on the virtual circuit contracts;

second dequeueing means for dequeueing cells from said first queue according to a second virtual circuit scheduling algorithm based on the virtual path contract;

the virtual circuit contracts for shaped virtual circuits specify a Peak Shaping Rate value;

the first virtual circuit scheduling algorithm utilizes a calculated sustained shaping rate increment value;

the virtual path contract specifies an sustained shaping rate value;

the second virtual circuit scheduling algorithm utilizes a calculated sustained shaping rate increment value; and for Constant Bit Rate service, the first virtual circuit scheduling algorithm utilizes the virtual path sustained shaping rate increment value in place of the virtual circuit peak shaping rate increment value.

8. The apparatus of claim 7, wherein:

said first and second virtual circuit scheduling algorithms are leaky bucket algorithms.

9. The apparatus of claim 8, wherein:

the leaky bucket algorithms utilize a calculated bucket and the calculated bucket for Constant Bit Rate service in the first virtual circuit scheduling algorithm is based in part on the virtual path contract.

10. The apparatus according to claim 9, wherein:

the calculated bucket for Constant Bit Rate service in the first virtual circuit scheduling algorithm is calculated according to the following formula $$Bm=((CDVT*PCR \text{ of virtual circuit})*(((353207/PCR \text{ of virtual circuit})*G)-((353307/PCR \text{ of virtual path})*G)))$$

where CDVT is (Cell Delay Variation Time) specified in the virtual circuit contract, PCR is peak cell rate specified in the virtual circuit and virtual path contracts, and G is either 1 or 128 based in part on a sustained cell rate specified in the virtual circuit contract.

11. The apparatus of claim 7, wherein:

the second virtual circuit scheduling algorithm treats all of the cells in said first queue as Constant Bit Rate traffic.

12. The apparatus according to claim 7, further comprising:

second buffer means for providing a buffer for each unshaped virtual circuit;

second enqueueing means for enqueueing cells from each unshaped virtual circuit to a corresponding buffer;

a second queue;

third dequeueing means for dequeueing cells from the buffers of unshaped virtual circuits, according to a fairness algorithm, to said second queue;

fourth dequeueing means for dequeueing cells from said second queue based on available virtual path bandwidth.

* * * * *